US007941949B2

(12) United States Patent
Cloninger

(10) Patent No.: US 7,941,949 B2
(45) Date of Patent: May 17, 2011

(54) MULTI-FLAG LABEL

(76) Inventor: Timothy N. Cloninger, Hoffman Estates, IL (US)

(*) Notice: Subject to any disclaimer, the term of this patent is extended or adjusted under 35 U.S.C. 154(b) by 372 days.

(21) Appl. No.: 12/152,042

(22) Filed: May 9, 2008

(65) Prior Publication Data

US 2008/0276504 A1 Nov. 13, 2008

Related U.S. Application Data

(60) Provisional application No. 60/928,939, filed on May 11, 2007.

(51) Int. Cl.

| | |
|---|---|
| ***G09F 3/00*** | (2006.01) |
| ***G09F 3/10*** | (2006.01) |
| ***B42D 15/10*** | (2006.01) |
| ***B32B 9/00*** | (2006.01) |
| ***B32B 33/00*** | (2006.01) |

(52) U.S. Cl. ........... 40/310; 40/324; 40/299.01; 40/638; 283/81; 283/101; 283/105; 283/900; 428/40.1; 428/41.7; 428/41.8; 428/354

(58) Field of Classification Search .................... 40/310, 40/299.01, 324, 638; 283/81, 101, 105, 900; 428/40.1, 41.7, 41.8, 354
See application file for complete search history.

(56) References Cited

U.S. PATENT DOCUMENTS

| | | | | |
|---|---|---|---|---|
| 257,136 A | | 4/1882 | Livor | |
| 3,228,129 A | | 1/1966 | Gwinn et al. | |
| 3,698,383 A | | 10/1972 | Baucom | |
| 4,312,523 A | | 1/1982 | Haines | |
| 4,781,696 A | | 11/1988 | Moulding, Jr. et al. | |
| 4,921,277 A | * | 5/1990 | McDonough | 283/81 |
| 4,976,351 A | | 12/1990 | Mangini et al. | |
| 5,048,870 A | * | 9/1991 | Mangini et al. | 283/81 |
| 5,090,942 A | | 2/1992 | Traise | |
| 5,651,775 A | | 7/1997 | Walker et al. | |
| 5,653,472 A | | 8/1997 | Huddelston | |
| 5,692,640 A | | 12/1997 | Caufield et al. | |
| 5,976,014 A | | 11/1999 | Petrick et al. | |
| 6,000,160 A | | 12/1999 | Riley | |
| 6,016,618 A | | 1/2000 | Attia et al. | |
| 6,067,739 A | | 5/2000 | Riley | |
| 6,279,759 B1 | | 8/2001 | Weisbach | |
| 6,438,881 B1 | | 8/2002 | Riley | |
| 6,576,315 B2 | * | 6/2003 | Treleaven et al. | 428/40.1 |
| RE38,189 E | | 7/2003 | Walker et al. | |
| 6,685,227 B2 | | 2/2004 | Merry et al. | |
| 6,793,075 B1 | | 9/2004 | Jeter | |

(Continued)

*Primary Examiner* — Joanne Silbermann
*Assistant Examiner* — Syed A Islam
(74) *Attorney, Agent, or Firm* — Meroni & Meroni, P.C.; Charles F. Meroni, Jr.; Christopher J. Scott

(57) ABSTRACT

A multi-flag label label-links a primary container to at least one secondary container. The multi-flag label comprises multiple layers and multiple regions intermediate its length. A back cut separates a first layer into unequal segment lengths. A transparent second layer is removably and adhesively attached to the first layer and is dimensioned such that the first layer frames the second layer with a peripheral boundary. A third layer is permanently bonded to the second layer and terminates adjacent the back cut, thereby exposing the back cut via the second layer. The third and second layers adjacent the back cut provide a parent label region; the remainder of the second and third layers provide a child label region, which region may be die cut into patterns for effecting child label(s). The parent and child labels may comprise information for cross-linking a source container to at least one secondary dose container.

13 Claims, 12 Drawing Sheets

U.S. PATENT DOCUMENTS

| | | | | |
|---|---|---|---|---|
| 6,813,868 | B2 | 11/2004 | Baldwin et al. | |
| 6,899,275 | B2 | 5/2005 | Schramm | |
| 6,915,619 | B2 | 7/2005 | Baldwin | |
| 6,957,522 | B2 | 10/2005 | Baldwin et al. | |
| 6,976,349 | B2 | 12/2005 | Baldwin et al. | |
| 6,994,249 | B2 | 2/2006 | Peterka et al. | |
| 7,047,682 | B2 | 5/2006 | Riley | |
| 7,074,209 | B2 | 7/2006 | Evans et al. | |
| 7,115,113 | B2 | 10/2006 | Evans et al. | |
| 7,140,135 | B2 * | 11/2006 | Irvine et al. | 40/638 |
| 7,458,177 | B2 * | 12/2008 | Sandel et al. | 40/638 |
| 2001/0054568 | A1 | 12/2001 | Weisbach | |
| 2002/0056989 | A1 | 5/2002 | Lewis-Leander | |
| 2002/0099334 | A1 | 7/2002 | Hanson et al. | |
| 2003/0061750 | A1 * | 4/2003 | Bernier et al. | 40/638 |
| 2004/0243434 | A1 | 12/2004 | Peterka et al. | |
| 2005/0022434 | A1 * | 2/2005 | Kimble et al. | 40/312 |
| 2005/0268505 | A1 | 12/2005 | Sandel et al. | |
| 2006/0259178 | A1 | 11/2006 | Ruben et al. | |

* cited by examiner

MULTI-FLAG LABEL

PRIOR HISTORY

This non-provisional patent application claims the benefit of provisional U.S. Patent Application No. 60/928,939, filed in the United States Patent and Trademark Office on May 11, 2007.

BACKGROUND OF THE INVENTION

1. Field of the Invention

The disclosed invention generally relates to a labeling system and method. More particularly, the disclosed invention relates to multi-flag label and method for labeling a primary source container and tracking doses of material taken and delivered to material recipients associated with a given primary source container.

2. Description of the Prior Art

The prior art discloses a variety of labeling means for identifying medicines and the like, as well as tracking dosages provided to patients. Some of the more pertinent prior art relating to labels and method of their use are described hereinafter. U.S. Pat. No. 3,698,383 ('383 patent), which issued to Baucom, for example, discloses an identification band, fastener and pilot tube for use in blood handling procedures to minimize blood transfusion errors. The fastener and pilot tube are integrally connected to the band and the pilot tube is adapted for release through action of the fastener when forming the band into a bracelet on an extremity. The bracelet and pilot tube carry removable labels presenting like indicia.

U.S. Pat. No. 4,312,523 ('523 patent), which issued to Haines, discloses a label for attachment to a container having a pharmaceutical product therein is in the form of an elongated strip substantially longer than the circumference of the container to which it is adapted to be secured. The strip is delineated into at least three zones with the two end zones including indicia identifying the product name, quantity of the product, and the expiration date. One of said end zones is provided with adhesive for securement to the container and is delineated from the remainder of the label by a perforation line.

U.S. Pat. No. 4,921,277 ('277 patent), which issued to McDounough, discloses methods of labeling and novel labels for needle syringes and medication vials are provided, involving fool-proof transfer of medication information labels peelable from the vial and applied as a syringe label tag or flag remote from the syringe barrel calibrations and in no way impeding physical syringe operation.

U.S. Pat. No. 5,048,870 ('870 patent), which issued to Mangini et al., discloses a kit for distributing pharmaceutical products comprising a tray of containers of drugs. Each container is provided with a multipart flag label. The flag label comprises a plurality of self-adhesive stickers which are used for labeling the container and for making entries in inventory records, medical charts, billing statements and the like. To use the kit a prescriber need only insert the patient's name, the date the drug is prescribed and the number of authorized refills on the label. All other information required by law or good practices is pre-printed on the label. The stickers are then detached from a protective backing sheet and affixed as indicated.

U.S. Pat. No. 5,651,775 ('775 patent), which issued to Walker et al., discloses a medication delivery and monitoring system and methods whereby drugs are safely delivered to a patient, monitored in real-time during delivery and crucial events are recorded during delivery to provide real-time, on-line information and detail for an audit trail. A novel safety label cradle unit is disclosed. Safety label cradles (SLC's) are provided in a plurality of sizes to match varying sizes of syringes which are disposed on a cradle of the SLC to provide a constant needle height on the SLC unit independent of syringe volume (barrel diameter). A selected SLC is securely affixed to a syringe by an adhesively backed label wrapping. The label is preprinted to provide drug identification indicia and drug preparation information. The information is automatically read into the system from the label. A novel delivery station of the system monitors drug delivery as a plunger of the syringe is pushed to deliver a drug to a patient. A smart tray in cooperation with a slider portion of the SLC is used to selectively deliver drugs to a port in the IV set. The smart tray comprises a first portion for carrying SLC units, an attachable second portion having a control panel for operating the system and a cover for lockably affixing the SLC units to the tray.

U.S. Pat. No. 5,653,472 ('472 patent), which issued to Huddleston et al., discloses a form having detachable labels and a wristband is provided. The form includes a face ply adhered to a liner ply by a pressure sensitive adhesive. The face ply includes a first portion and a second portion, where the first portion is die cut to form a wristband and the second portion is die cut to form a series of detachable labels. The form may be printed in a single pass through a printer to provide the wristband and labels with correlating printed indicia.

U.S. Pat. No. 5,692,640 ('640 patent), which issued to Caulfield et al., discloses a system for establishing and maintaining the identity of a medication in a syringe (80) from the point in time that a medication is withdrawn from a vial (30) to the point in time that the medication is administered to a patient. This method is based on integrating a label dispenser (40) including preprinted, pressure sensitive, syringe labels (71) with a medicine vial (30). As the medication is withdrawn from the vial a label is provided that identifies the contents of the vial. When this label is applied to the syringe it provides the ability to verify that the correct medication and dosage is being administered to the correct patient. Subsequently the label can be removed from the syringe and used to provide a permanent record of the administration.

U.S. Pat. No. 6,685,227 ('227 patent), which issued to Merry et al., discloses an arrangement of pharmaceutical labels in a sheet and to a method of monitoring administration of the pharmaceuticals to a patient using those labels. The labels may include indicia to assist transferal of information and/or to a label including information to assist in the administration by infusion of a pharmaceutical to a patient.

U.S. Pat. No. 6,685,678 ('678 patent); U.S. Pat. No. 7,074,209 ('209 patent); and U.S. Pat. No. 7,115,113 ('113 Patent), which issued to Evans et al., disclose drug administration systems including a cradle attached about an intravenous injection port having a flange extending therefrom. The cradle supports first drug administration information in the nature of machine and human readable code, for example, barcode. A syringe including a needle includes a flange extending from the syringe. The syringe supports second drug administration information in machine and/or human readable form. A scanner module is constructed to slideably receive the flange of the cradle and syringe whereby the syringe needle is aligned with the intravenous injection port. The module may be provided with an electronic scanning system for identifying the first and second drug administration information, as well as determining the amount of the drug being administered from the syringe to the injection port by monitoring movement of the syringe plunger. The information and data may be stored within the module for uploading to a remote location.

U.S. Pat. No. 6,994,249 ('249 patent), which issued to Peterka et al., discloses a system and method for drug management using transferable labels provides a chain of identity for medications from their arrival in a pharmacy to administration to a patient. Drug information is read, in some embodiments optically, and imprinted on a transferable label optionally fabricated of low stretch, chemical resistant material, that is attached to the medication package. The transferable label is checked to make sure that it correctly corresponds to the drug information. At the time of preparation for administration, the transferable label is transferred from the medication package to the administration device, typically a syringe or dose cup. The health care giver scans the patient identification information, usually found on an identification bracelet, the transferable label, and optionally, a unique code belonging to the administering party. The system will reject non-matches between scanned inputs, and may be configured with a variety of safety steps, displays, and reports.

U.S. Pat. No. 7,047,682 ('682 patent), which issued to Riley, discloses a business form particularly adapted for use during medical emergencies includes in a first embodiment a wristband/label assembly that is readily separable from a carrier, with the wristband including a single end for looping around a victim's appendage through a cinch and a tab carrying a plurality of labels with the wristband and each label having an identifying indicia such as a bar code printed thereon. The wristband bar code thus becomes associated with the victim and the labels are used to identify items associated with the patient such as his possessions, medical charts, medicines, etc. The wristband may be color coded so that as the medical personnel triage victims they are categorized by color as to their need for medical care, with the color coding thus being readily ascertainable by others as multiple victims are processed. A second embodiment includes a preprinted form having a tab portion with the bar code labels as in the first embodiment and also a series of tear off tabs for indicating the medical condition of the patient. Additionally, the medical condition tabs may also be bar coded so that the patient's ID and medical condition may both be "swiped" into a data base using bar code information. Once the data is collected, it is conveniently input into a computer with the computer then transmitting the information to a server for display at a web site. The server and related software is fully capable of handling input from multiple computers in real time so that victim information is made available over the internet almost immediately as the victims are processed.

United States Patent Application No. 2002/0099334 describes a tracking code is adhered to a syringe label cradle for tracking each activity regarding the syringe label cradle, e.g., drug preparation, drug inventory, drug dispensing, drug administration, drug return, drug charges, etc. The tracking code may be in the form of bar or other machine readable code, as well as human readable indicia. The unique tracking code enables tracking of events pertaining to a specific syringe from the time of being prepared with a prescribed drug to its disposal or return to a hospital pharmacy. A log is created relating the patient to the specific drug used and all information inputted with respect to the tracking code.

U.S. Pat. No. RE38,189 describes a medication delivery and monitoring system and methods whereby drugs are safely delivered to a patient, monitored in real-time during delivery and crucial events are recorded during delivery to provide real-time, on-line information and detail for an audit trail. A novel safety label cradle unit is disclosed. Safety label cradles (SLC's) are provided in a plurality of sizes to match varying sizes of syringes which are disposed on a cradle of the SLC to provide a constant needle height on the SLC unit independent of syringe volume (barrel diameter). A selected SLC is securely affixed to a syringe by an adhesively backed label wrapping. The label is preprinted to provide drug identification indicia and drug preparation information. The information is automatically read into the system from the label. A novel delivery station of the system monitors drug delivery as a plunger of the syringe is pushed to deliver a drug to a patient. A smart tray in cooperation with a slider portion of the SLC is used to selectively deliver drugs to a port in the IV set. The smart tray comprises a first portion for carrying SLC units, an attachable second portion having a control panel for operating the system and a cover for lockably affixing the SLC units to the tray.

It may be seen from a consideration of the foregoing that the prior art appears to be silent on a multi-flag label comprising (1) an adhesive, transparent end for simultaneously (a) overlying information borne by the source container and (b) attaching the multi-flag label to the source container; (2) an intermediate parent label for identifying the source container with a user; and (3) a series of child labels for cross-linking the primary source container via the parent label with secondary dose delivery containers. Accordingly, the prior art perceives a need for such a multi-flag label as described in more detail hereinafter.

SUMMARY OF THE INVENTION

The multi-flag label according to the present invention is a label primarily designed for use in medical dispensing scenarios, and particularly designed for multi-dose applications from a single medication source. The multi-flag label further supports certain labeling methodology, which may be used in a variety of different settings. This method of labeling is particularly well suited for the healthcare field in terms of labeling multi-dose container(s) of medications.

The multi-flag label according to the present invention may be used by a nurse or similar other caregiver to provide identification of the medication removed from the original container, which would be otherwise unlabeled as it is administered to patient. Failure to have a medication labeled even momentarily is problematic since an unlabeled medication could easily be confused with another medication. All medications should be labeled up to the moment of administration to the patient.

The 'multi-flag label' according to the present invention comprises a length and width. Spanning the width is a transparent source-attaching region, a parent label region, and child label region. The transparent source-attaching region is located at a first end of the label and extends toward a second end a distance sufficient to blanket or overlie patient/medication information located on a medicine source.

The parent label region extends from the source-attaching region toward the child label region and comprises superficial indicia for identifying the patient/medication. The parent label region has a longitudinal axis spanning the width of the multi-flag label, which axis extends in a direction that is substantially parallel to the axis of the medication-dispensing source bottle or similar other container.

The child label region preferably comprises a plurality of child labels, the axes of which may extend orthogonal to the axis of the parent label, or parallel thereto depending on the number of child labels associated with the parent label region. When attached to a primary source container such as a medication source bottle, the child labels extend away from the source container for easing removal thereof from the multi-flag label. Each child label comprises the superficial indicia for cross-linking the child label to the parent label for further identifying the patient/medication. In this last regard, it is contemplated that the parent and child labels may comprise bar-codes for enabling the use of scanning mechanisms for quickly and reliably inputting patient/medication data/information.

Conceivably, each 'multi-flag' label preferably comprises one to six or more smaller child labels which will be removed and attached to a medication secondary container (such as a syringe) to provide positive identification until the medication is administered to the patient. Other unique features of the multi-flag label include stackability of the 'multi-flag labels'. In this regard, it is contemplated that the labels may be attached on top of each other at the clear adhesive area of each 'multi-flag label' and attached to the original medication container allowing more than one 'multi-flag' label onto the original container. This provides access to child labels in set quantities as provided by stacked labels.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of our patent drawings, as follows:

FIG. 17(*a*) is a fragmentary side view of one end of the first construction of the multi-flag label with a multi-layer child label being removed from a bottom layer.

DETAILED DESCRIPTION OF THE PREFERRED EMBODIMENT

Figure 15:
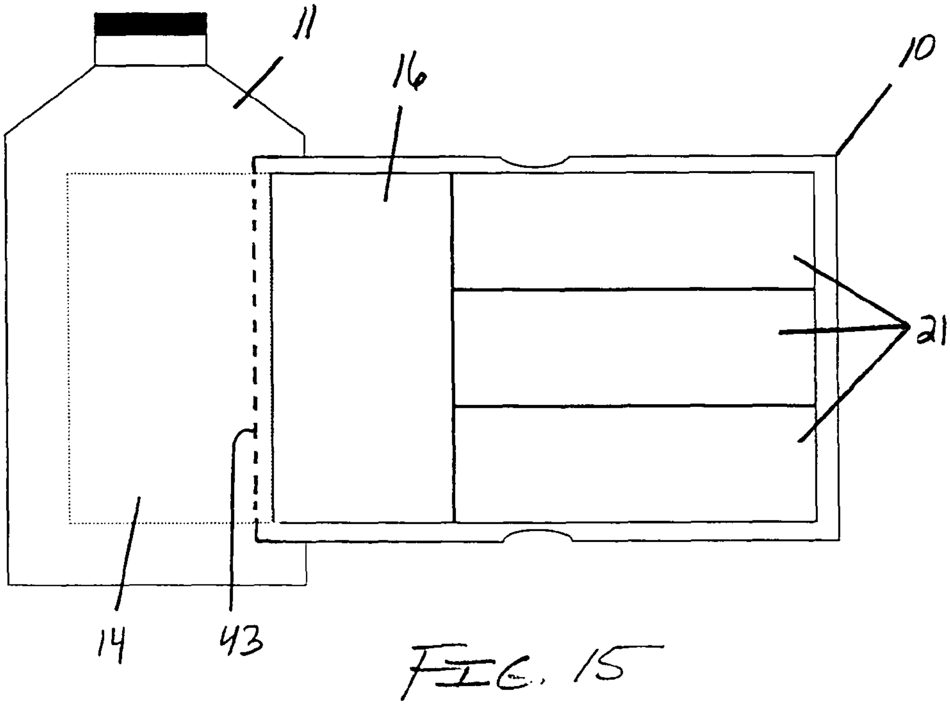
FIG. 15 is a frontal type depiction of the multi-flag label otherwise depicted in FIG. 6 and 14 with a first segment of a bottom layer removed thereby exposing adhesive for adhesively attaching the label to a primary source container at one end of the label.
Figure 16:
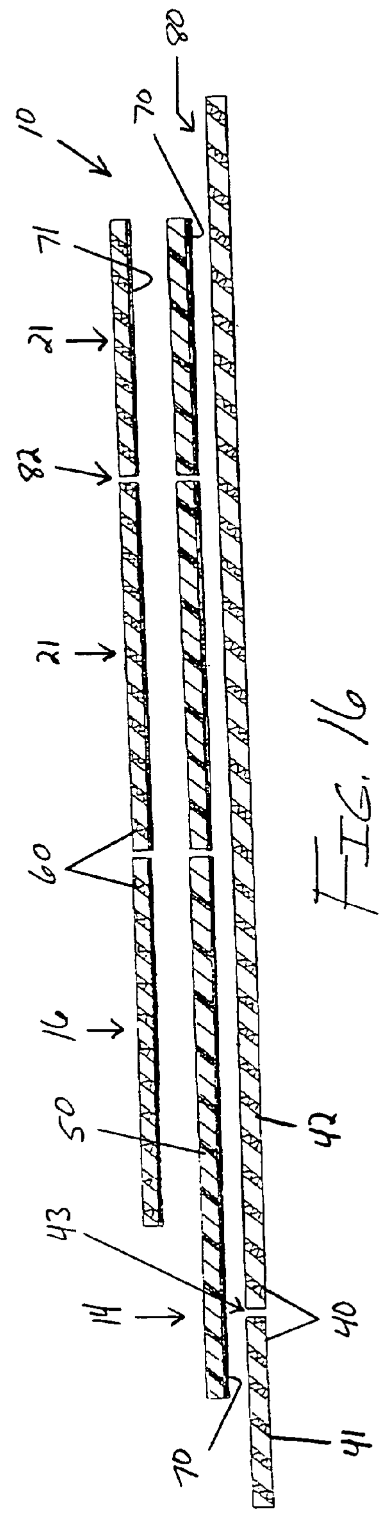
FIG. 16 is an exploded side view of a first construction of the multi-flag label with layer thicknesses being exaggerated for clarity of inspection.
Figure 17:
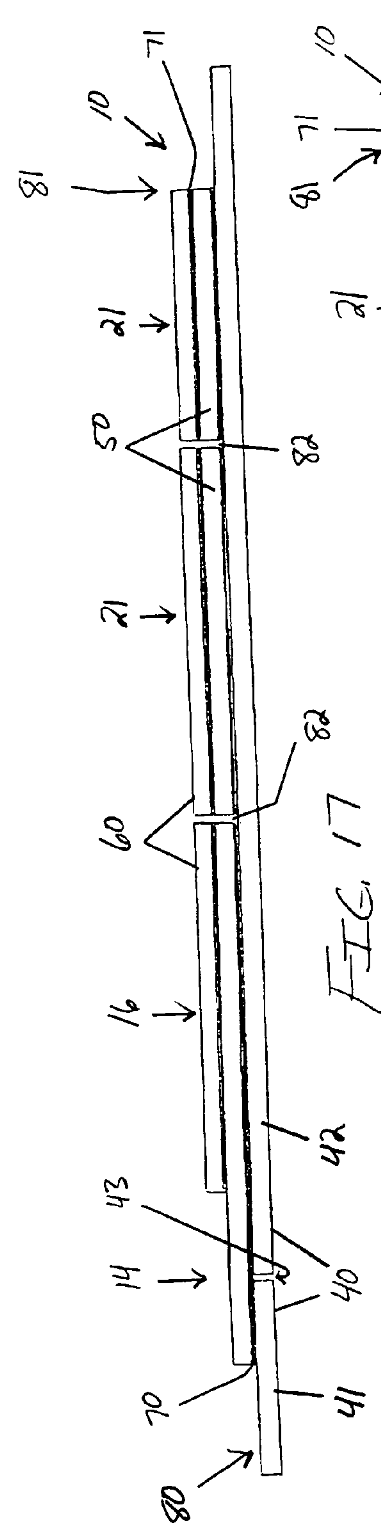
FIG. 17 is a side view of a generic construction of the multi-flag label in assembled form with layer thicknesses being exaggerated for clarity of inspection.
Figure 17A:
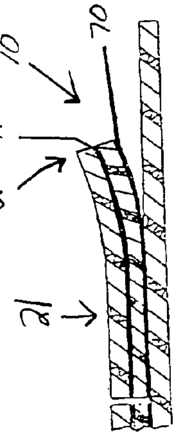
Figure 18:
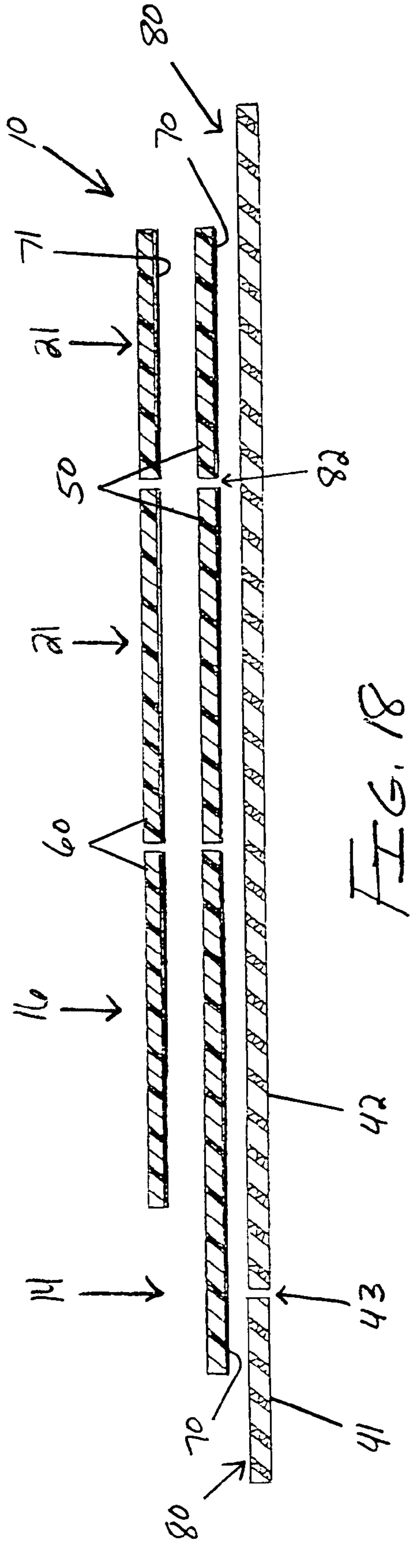
FIG. 18 is an exploded side view of a second construction of the multi-flag label with layer thicknesses being exaggerated for clarity of inspection.
Figure 19:
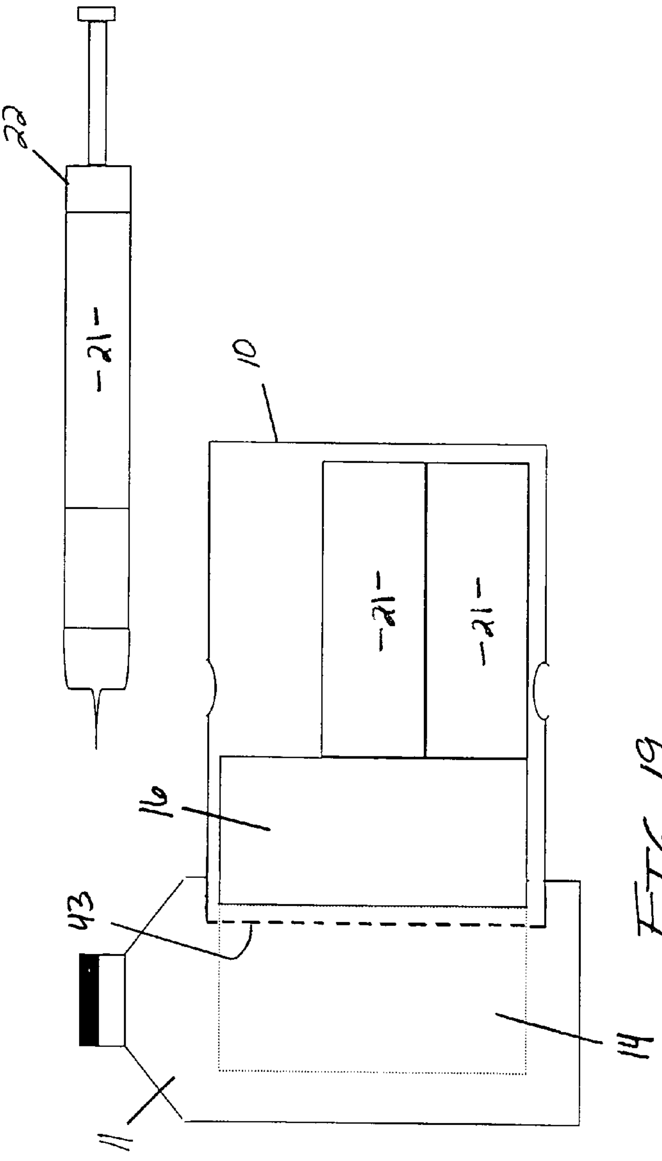
FIG. 19 is a frontal type depiction of the multi-flag label attached to a primary source container as otherwise depicted in FIG. 15 with a first child label having been removed and attached to a secondary dose container (syringe).

Referring now to the drawings, the preferred embodiment of the present invention concerns a multi-flag label 10 as generally illustrated and referenced in FIGS. 1-21, inclusive. It is contemplated that the label 10 according to the present invention is designed primarily as a label for use in medical dispensing scenarios, particularly multi-dose applications from a primary source container 11 as generally depicted and referenced in FIGS. 15, 19, and 20. It is contemplated that the primary source container may be preferably defined by a container for sourcing medicine or similar other products. Other applications are conceivable, however, and thus the label 10 should not be construed as being limited to use within the medical industry.

It is further believed that the label 10 supports certain methods of use for labeling multi-dose primary source containers 11 and the dose delivering vessels or secondary dose containers such as syringes 22 that are commonly used to deliver medicine to patients as sourced from container 11. The label 10, for example, may be used by the nurse or similar other healthcare provider to more properly identify medication(s) being removed from a source container 11 to a syringe 22, and to log or track the doses administered to any given patient.

In this last regard, it is noted that failure to properly label medication poses significant risks to patients serviced within the healthcare industry. Common mistakes that occur often include providing an incorrect dosage to any given patient and dosing a patient with an incorrect medicine. It should be readily understood that all medications should be labeled up to the moment of administration to the patient in order to minimize errors that may occur during treatment.

Figure 1:
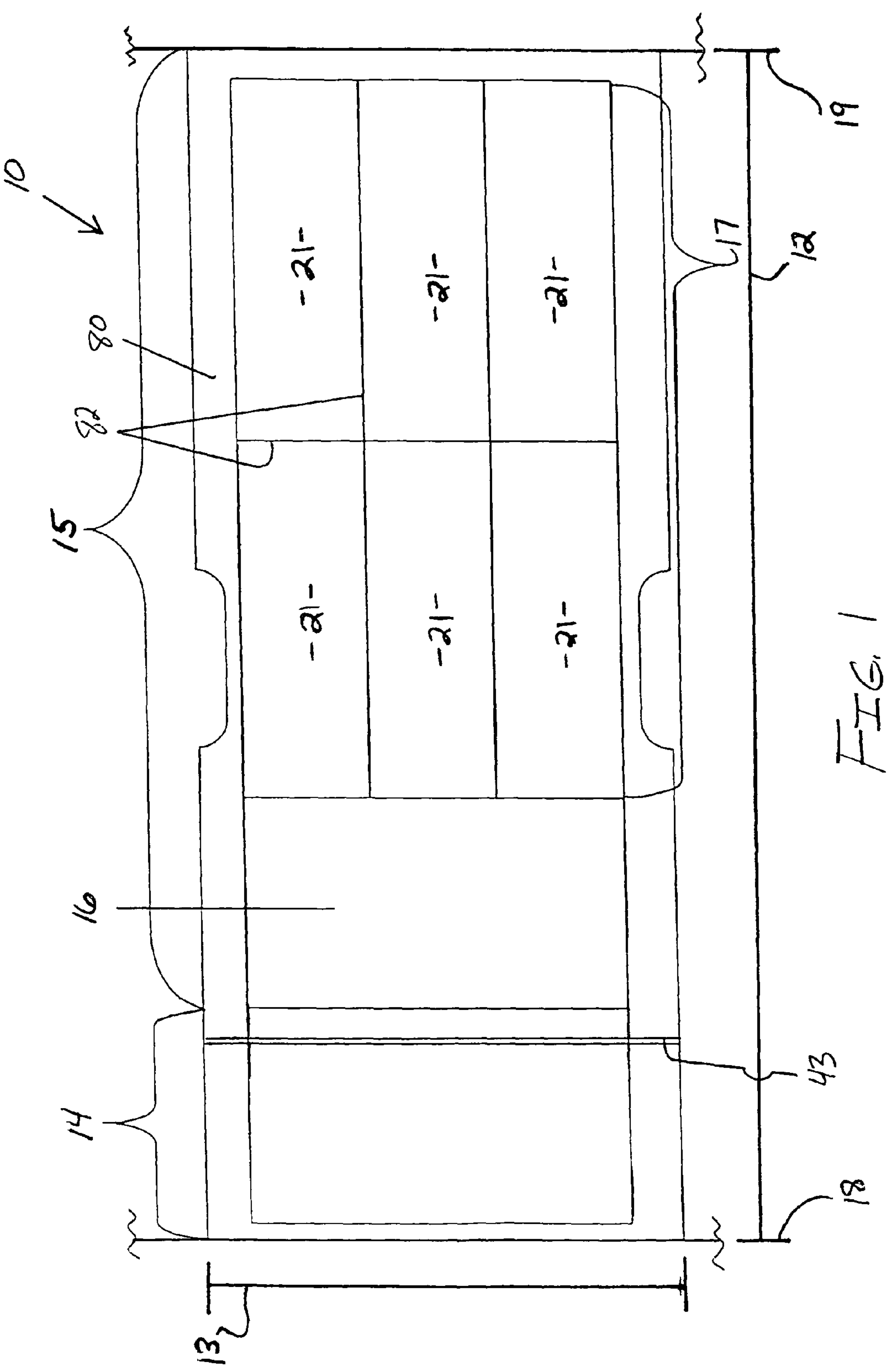
FIG. 1 is a first plan type depiction of a preferred multi-flag label according to the present invention showing a single parent label and six child labels.
Figure 2:
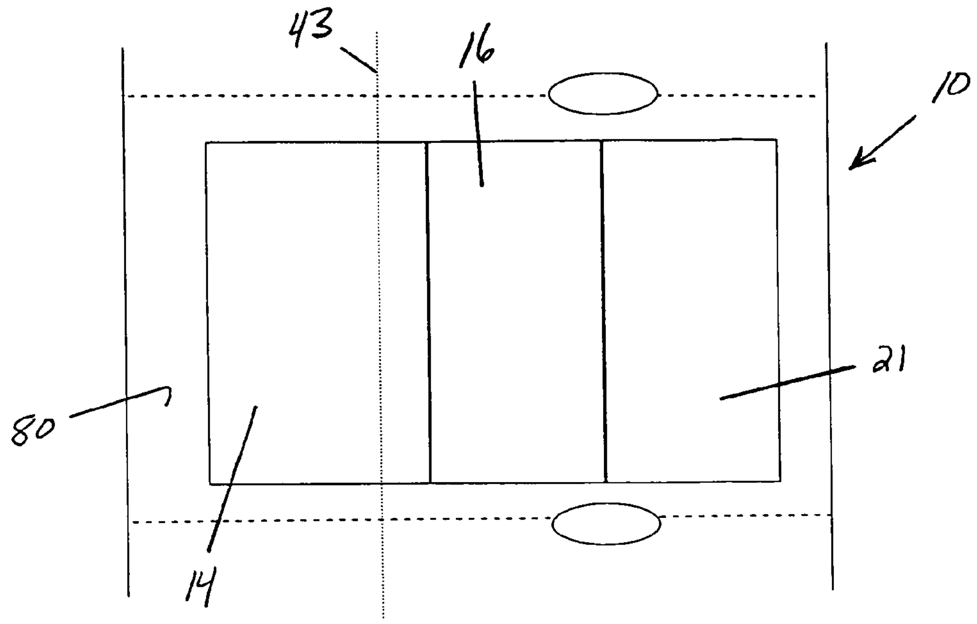
FIG. 2 is a plan type depiction of an alternative multi-flag label according to the present invention showing a single parent label and a single child label.
Figure 3:
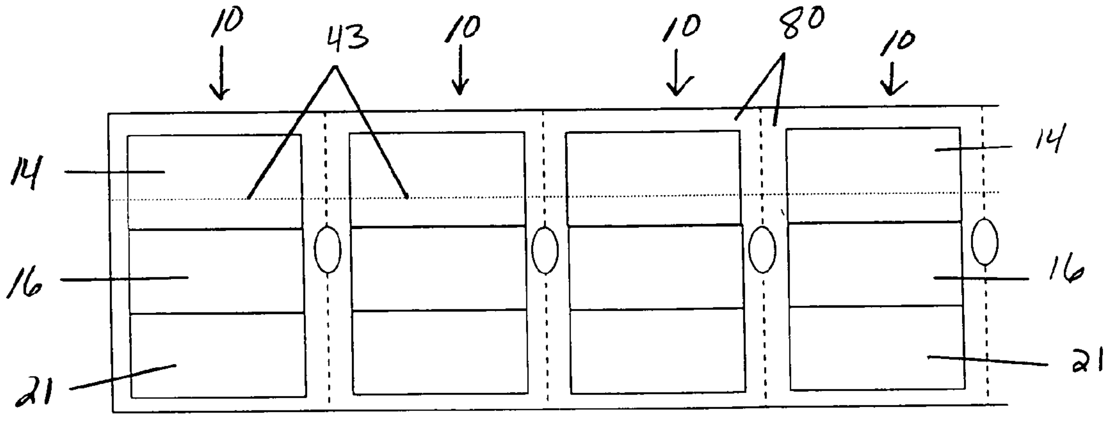
FIG. 3 is a plan type depiction of a series of linked multi-flag labels otherwise depicted in FIG. 2.
Figure 4:
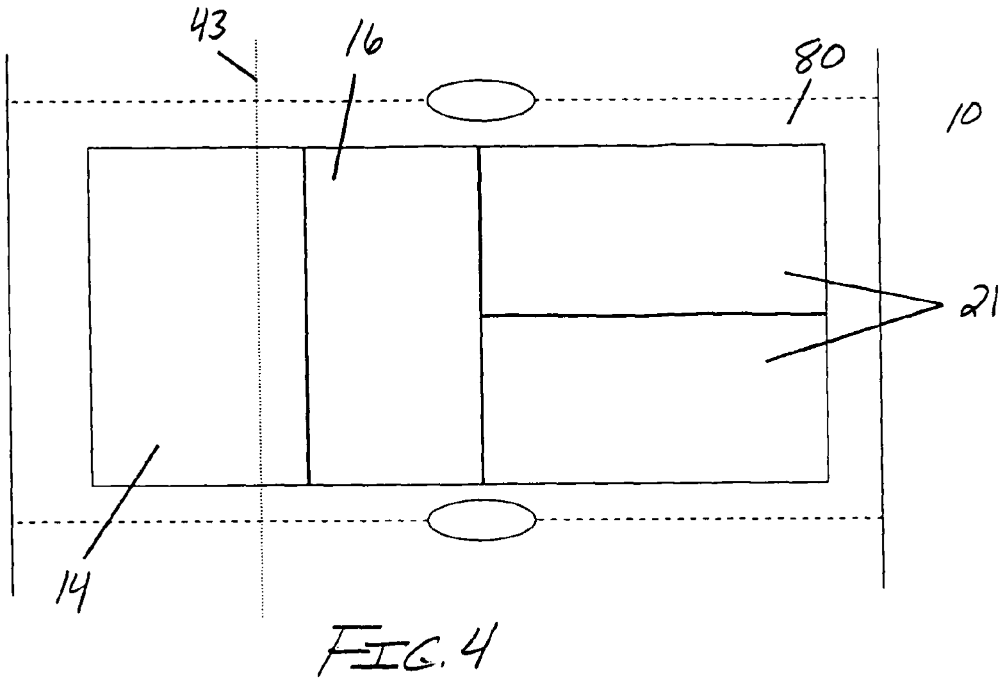
FIG. 4 is a plan type depiction of an alternative multi-flag label according to the present invention showing a single parent label and two child labels.
Figure 5:
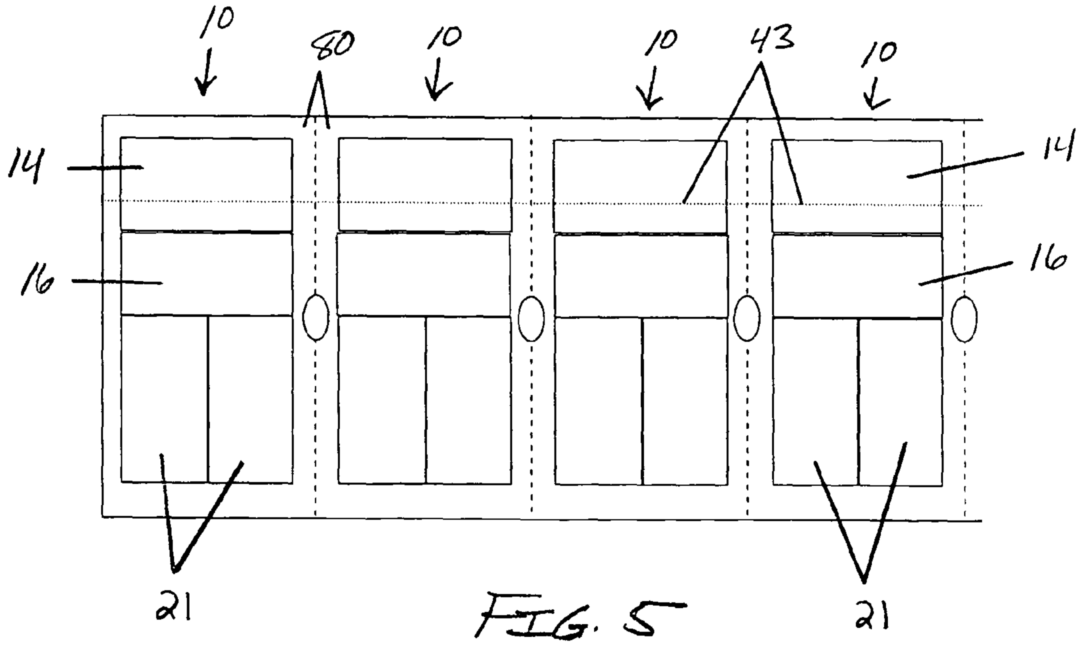
FIG. 5 is a plan type depiction of a series of linked multi-flag labels otherwise depicted in FIG. 4.
Figure 6:
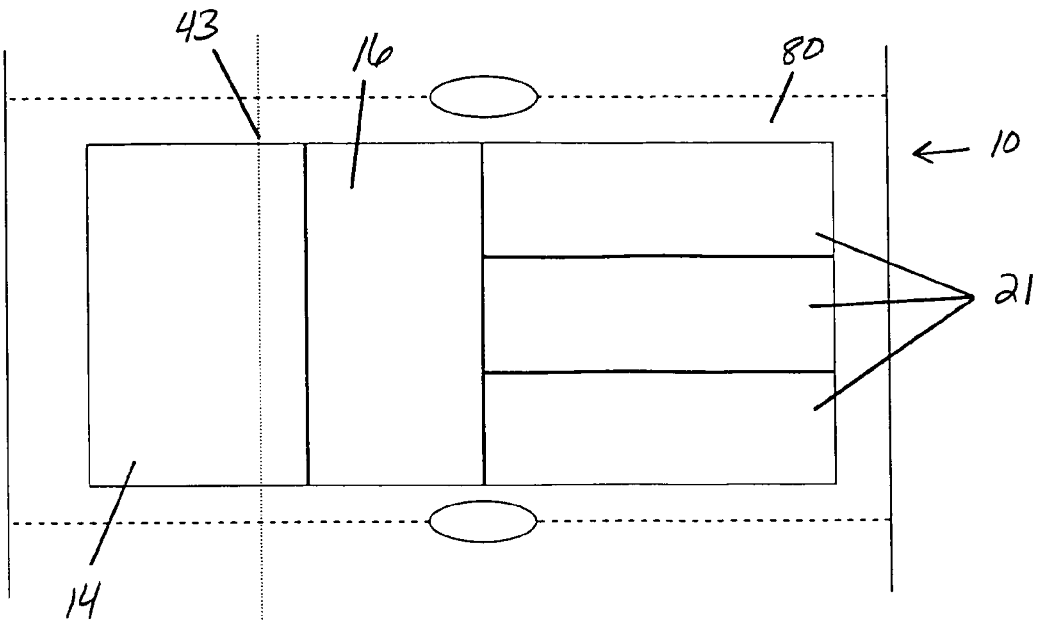
FIG. 6 is a first plan type depiction of an alternative multi-flag label according to the present invention showing a single parent label and three child labels.
Figure 7:
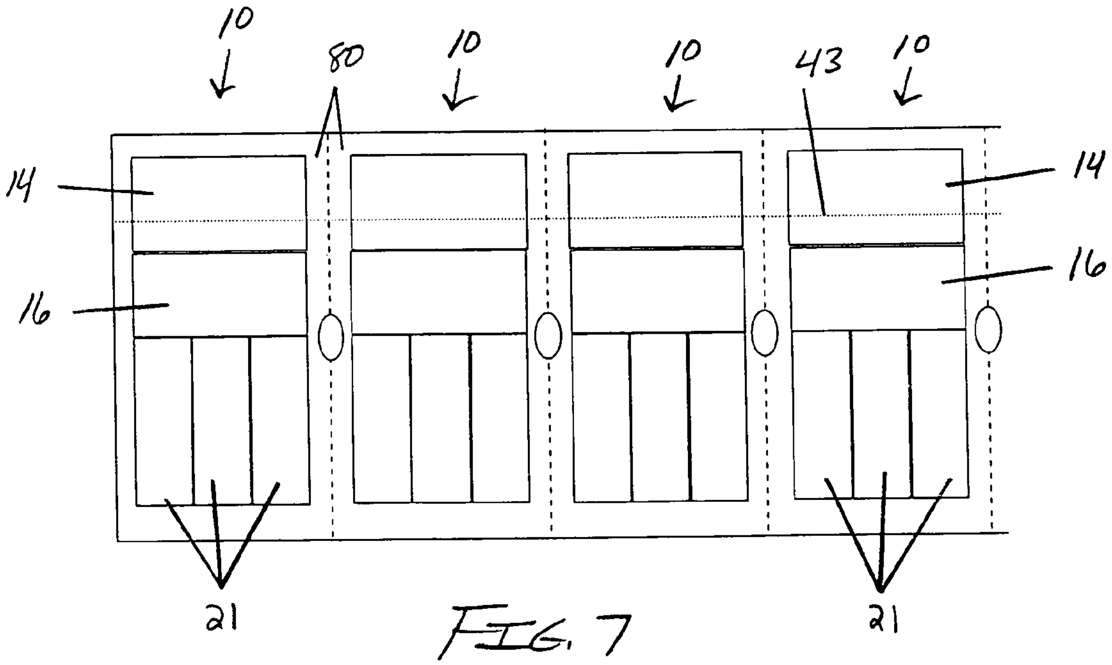
FIG. 7 is a plan type depiction of a series of linked multi-flag labels otherwise depicted in FIG. 6.
Figure 8:
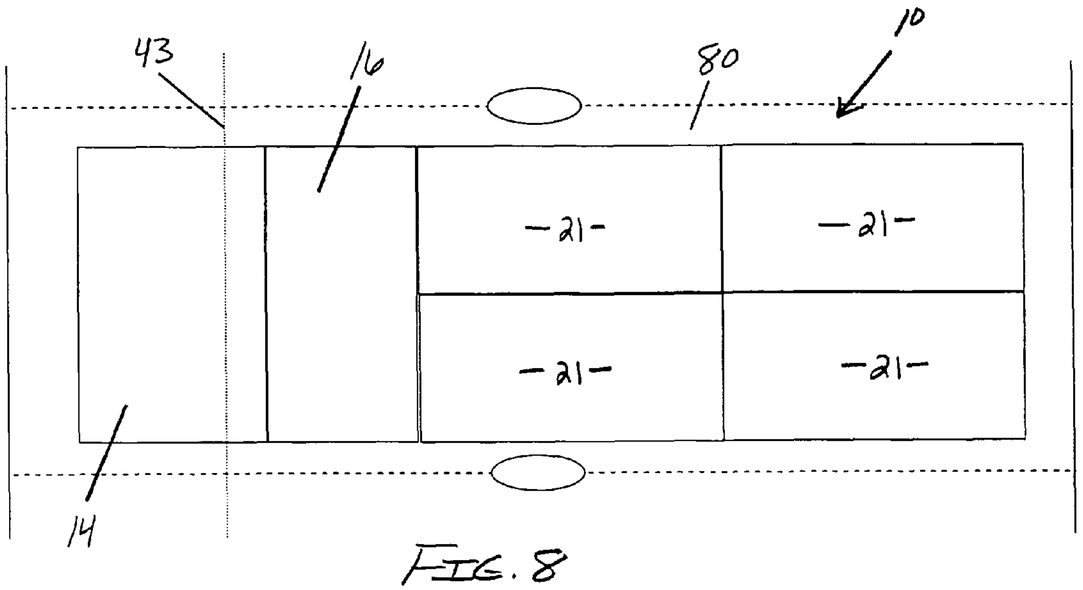
FIG. 8 is a plan type depiction of an alternative multi-flag label according to the present invention showing a single parent label and four child labels.
Figure 9:
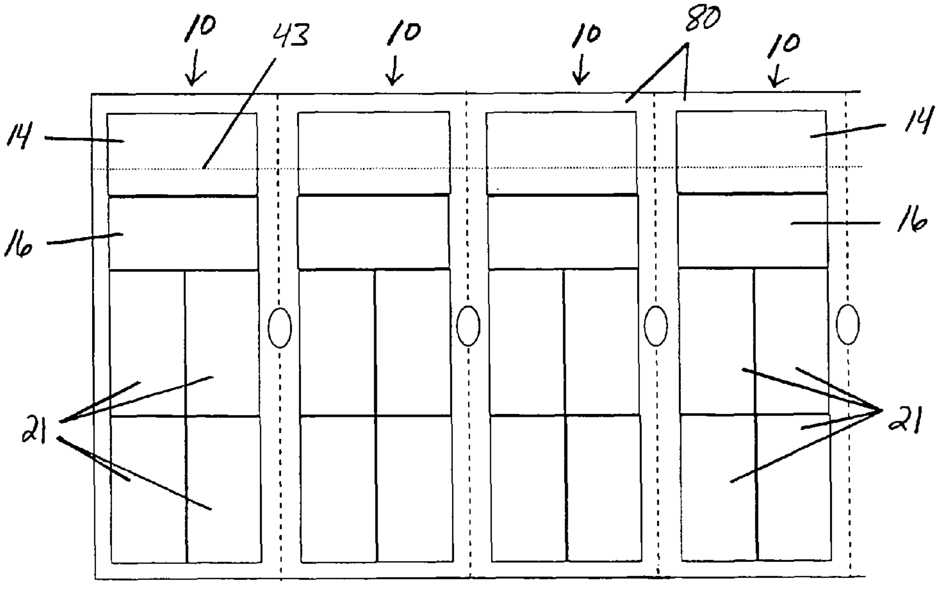
FIG. 9 is a plan type depiction of a series of linked multi-flag labels otherwise depicted in FIG. 8.
Figure 10:
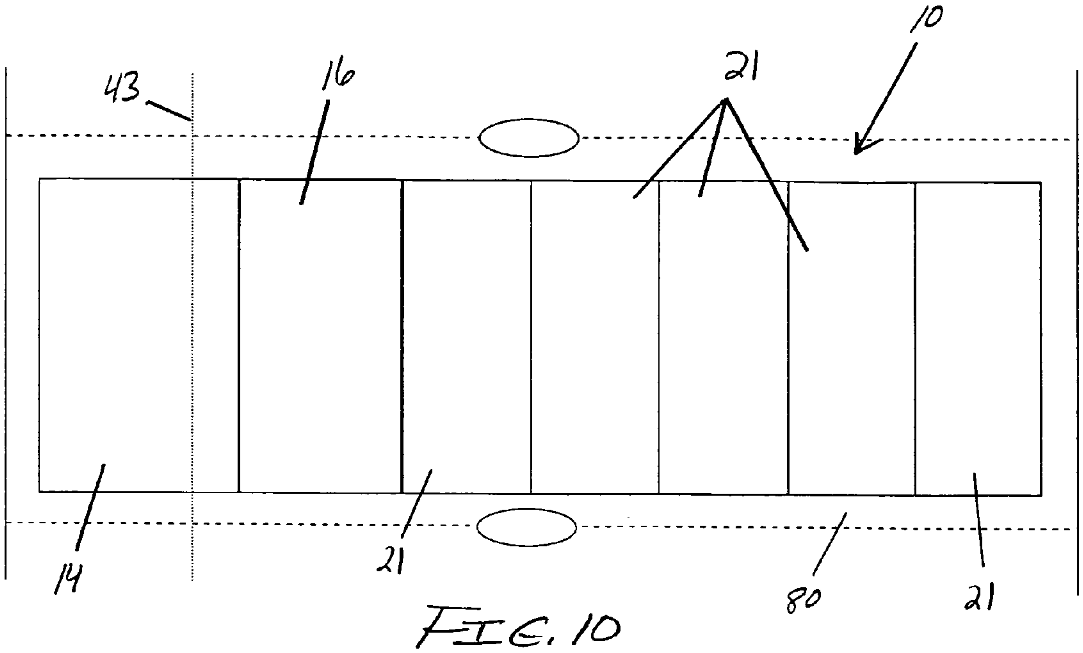
FIG. 10 is a plan type depiction of an alternative multi-flag label according to the present invention showing a single parent label and five child labels.
Figure 11:
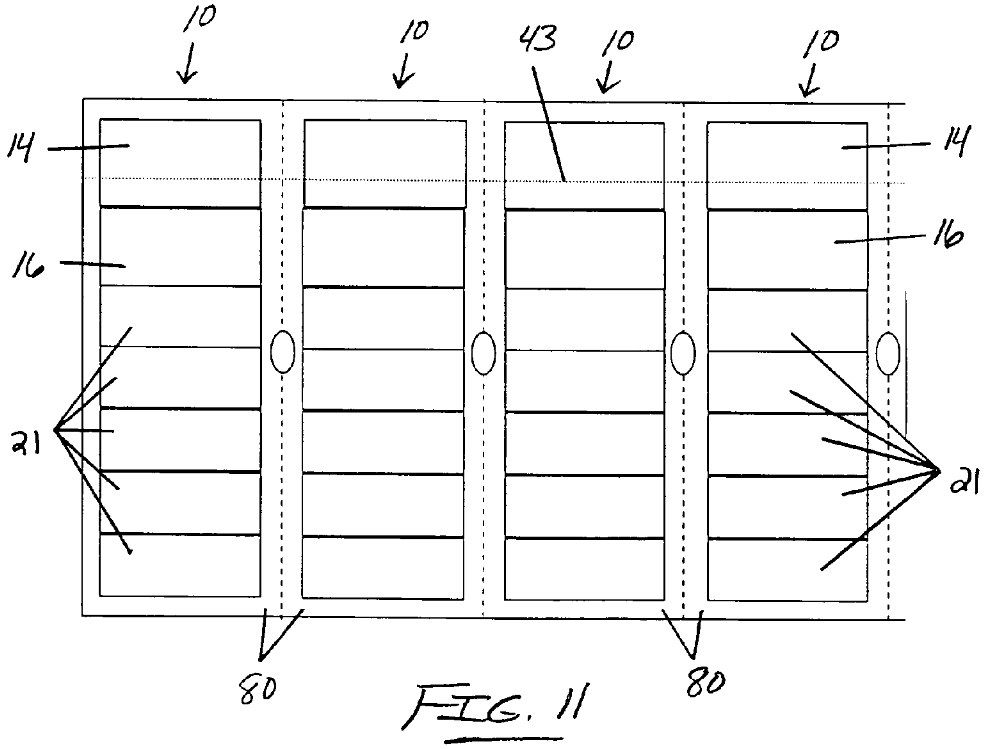
FIG. 11 is a plan type depiction of a series of linked multi-flag labels otherwise depicted in FIG. 10.
Figure 12:
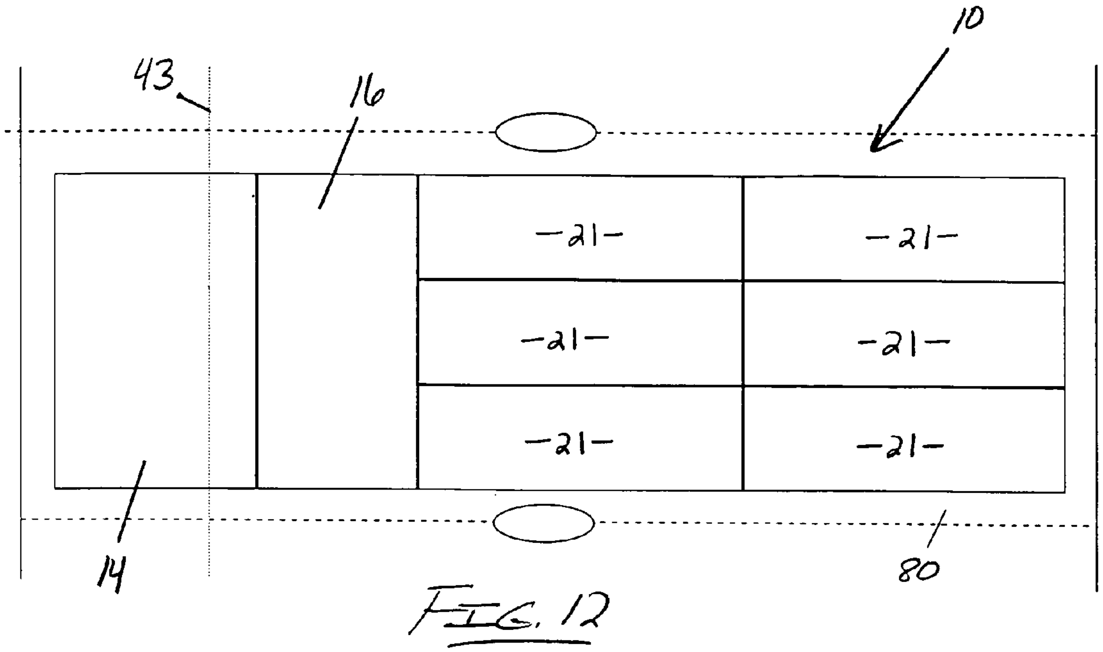
FIG. 12 is a second plan type depiction of the preferred multi-flag label according to the present invention showing a single parent label and six child labels.
Figure 13:
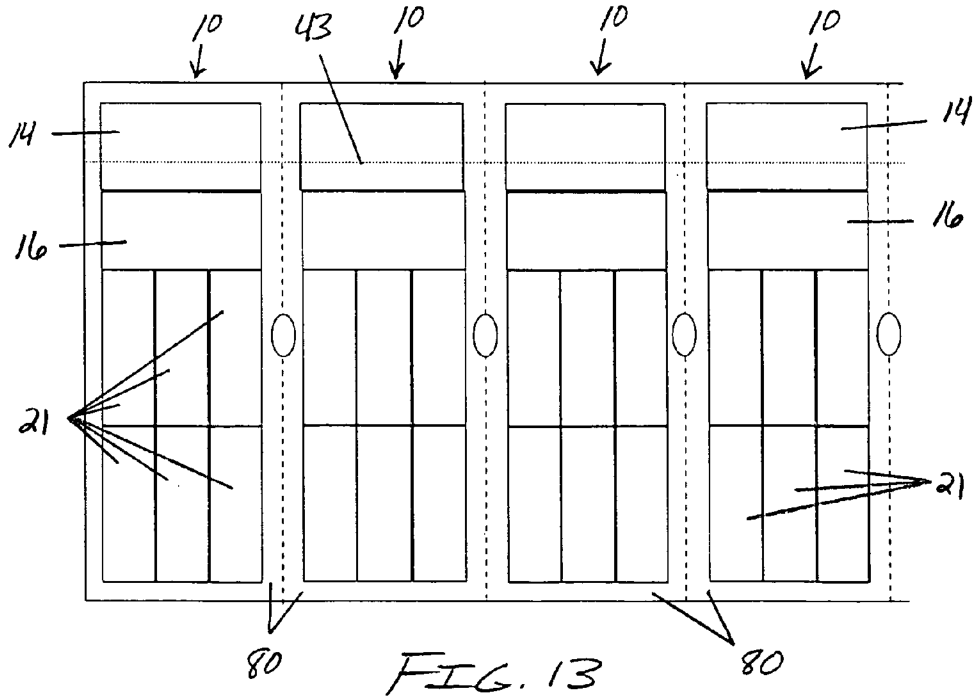
FIG. 13 is a plan type depiction of a series of linked multi-flag labels otherwise depicted in FIG. 1 and 12.
Figure 14:
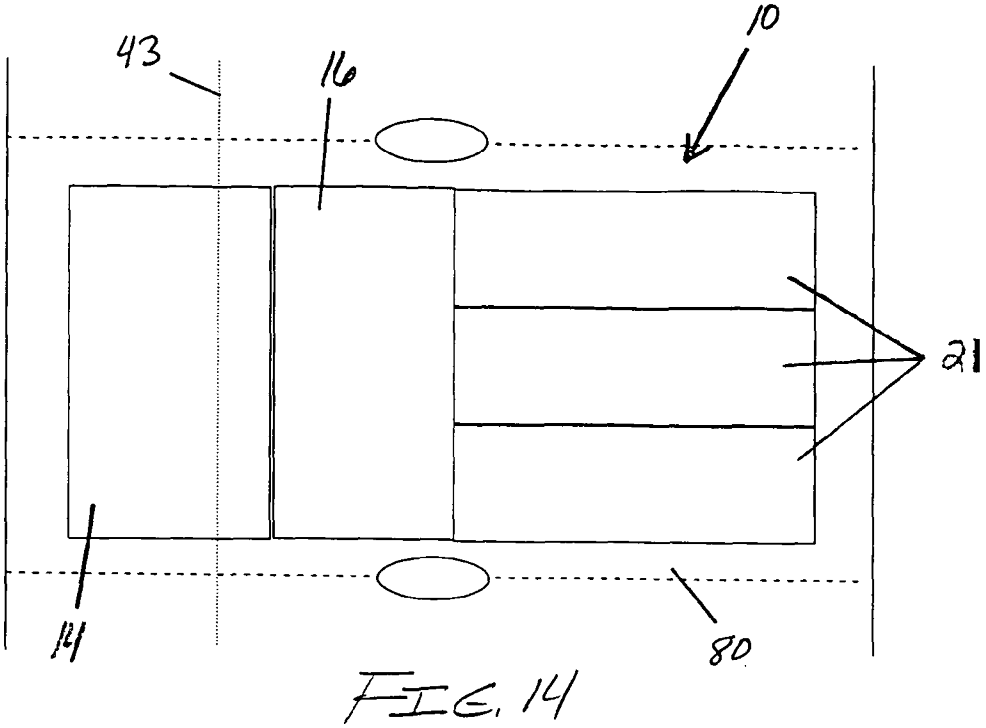
FIG. 14 is a second plan type depiction of the multi-flag label otherwise depicted in FIG. 6.

The so-called 'multi-flag' label 10 according to the present invention comprises a length 12 and width 13 as generally depicted and referenced in FIG. 1. Further, it may be understood from a consideration of FIG. 1 that the label 10 further comprises a transparent source-attaching region 14 and a labeling region 15. The labeling region 15 comprises a child label region as referenced at 17 and a parent label region as referenced 16.

The transparent source-attaching region 14 is located at a first end 18 of the label 10 and extends toward a second end 19 a distance sufficient to blanket patient/medication information located on a primary source container 11. In this regard, the reader is directed to FIG. 21. Certain bar code information or similar other container borne indicia 30 may be borne by the container 11 itself. Transparent ends of the label 10 may overlie the container borne indicia 30 for enabling the user to visually perceive the underlying indicia 30.

The parent label region 16 extends from the source-attaching region 14 toward the child label region 17 and comprises superficial parent label indicia 20 for identifying the patient/medication. The parent label region or parent label 16 extends in a direction or plane that is substantially parallel to the axis of the primary source container 11.

Figure 20:
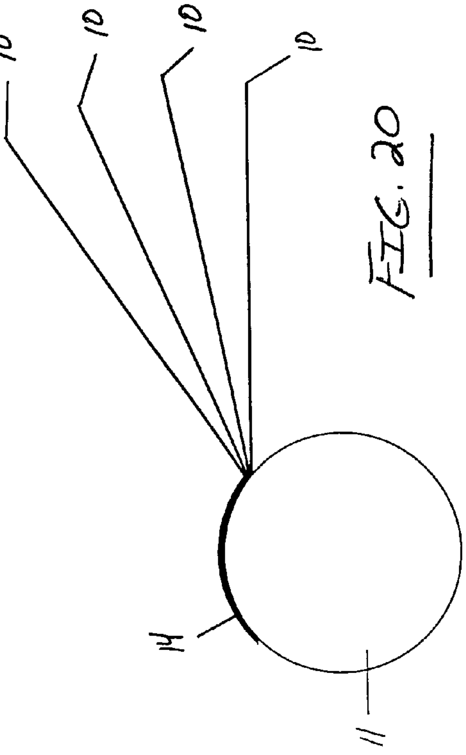
FIG. 20 is a bottom view of a primary source container with four multi-flag labels attached in layered relation to the container via first ends thereof.

The child label region 17 comprises at least one, but preferably a plurality of child labels 21, the axes of which may either extend orthogonal to the axis of the parent label region 16 or parallel thereto depending on the layout of the child label(s) 21 as may be understood from a comparative inspection of FIGS. 2-13. When the child labels 21 are attached to a primary source container 11, the child labels 21 extend away from the source container 11 as generally depicted in FIG. 20.

Each child label 21 may preferably comprise the same superficial indicia 20 as the parent label 16 for correspondingly identifying the patient/medication. The child labels 21 are positioned adjacent the second end 19 of the multi-flag label 10 for ease of withdrawal from the multi-flag label 10 and attachment to a secondary dose container such as a syringe 22 as generally depicted and referenced in FIG. 19 and 21.

It is contemplated that the parent and child labels 16 and 21, respectively, may comprise bar-codes 23 for enabling the use of state of the art scanning mechanisms for quickly and reliably inputting or entering and tracking patient/medication data/information. The child labels 21 may be removed and attached to a secondary (dose) container (such as a syringe 22) to provide positive identification until the medication is administered to the patient.

Other unique features include stack-ability of labels 10. In this regard, the reader is further directed to FIGS. 20 and 21. From an inspection of the noted figures, it may be seen that numerous 'multi-flag labels' 10 can be attached or stacked upon one another such that stacked transparent adhesive areas 14 of successive labels 10 enable the user to readily view patient/medicine information otherwise affixed to the source container 11.

An exemplary bar code 23(*a*) is borne by the container 11, and the transparent adhesive areas 14 of successively stacked labels 10 overlie the bar code 23(*a*). Notably, this stacking feature allows the attachment of more than one 'multi-flag' label 10 to the source container 11 and a corresponding increase in the number of child labels 21 for further tracking the medication dosages being removed from the primary source container 11.

The transparent source-attaching region 14 comprises an adhesive backing 70 that may be revealed by removing a first bottom layer segment 41. The first bottom layer segment 41 is separated from a second bottom layer segment 42 by a back slit or back cut 43 formed in a paper backing or bottom layer 40 of the label 10 to which the top layer 60 and intermediate layer 50 may be removably attached. Removing the appropriate paper backing 40 of the first bottom layer segment 41 at the back cut 43 reveals the clear portion of the label 10 to be adhesively applied to the primary source container 11.

The label 10 is preferably applicable to a container 11 considered a multi-dose container 11 such as an insulin bottle. The label 10 may be applied to the container 11, and the transparent, source-attaching portion or region 14 do not obstruct any original information (as at 23(*a*)) borne by the container 11.

There are preferably a plurality of miniature or child labels 21 that may be peeled off one at a time and applied to the secondary dose container (such as syringe 22) that the nurse or similar other caregiver utilizes to provide the patient with a dose. Notably, a source bottle of insulin may enable the healthcare provider to withdraw dosed medication 15-20 times. The labels 10 according to the present invention are designed to be attached one on top of the other so that one can apply a sufficient number of child labels 21 to cover the total number of anticipated doses that are to be withdrawn from the source container 11.

Figure 21:
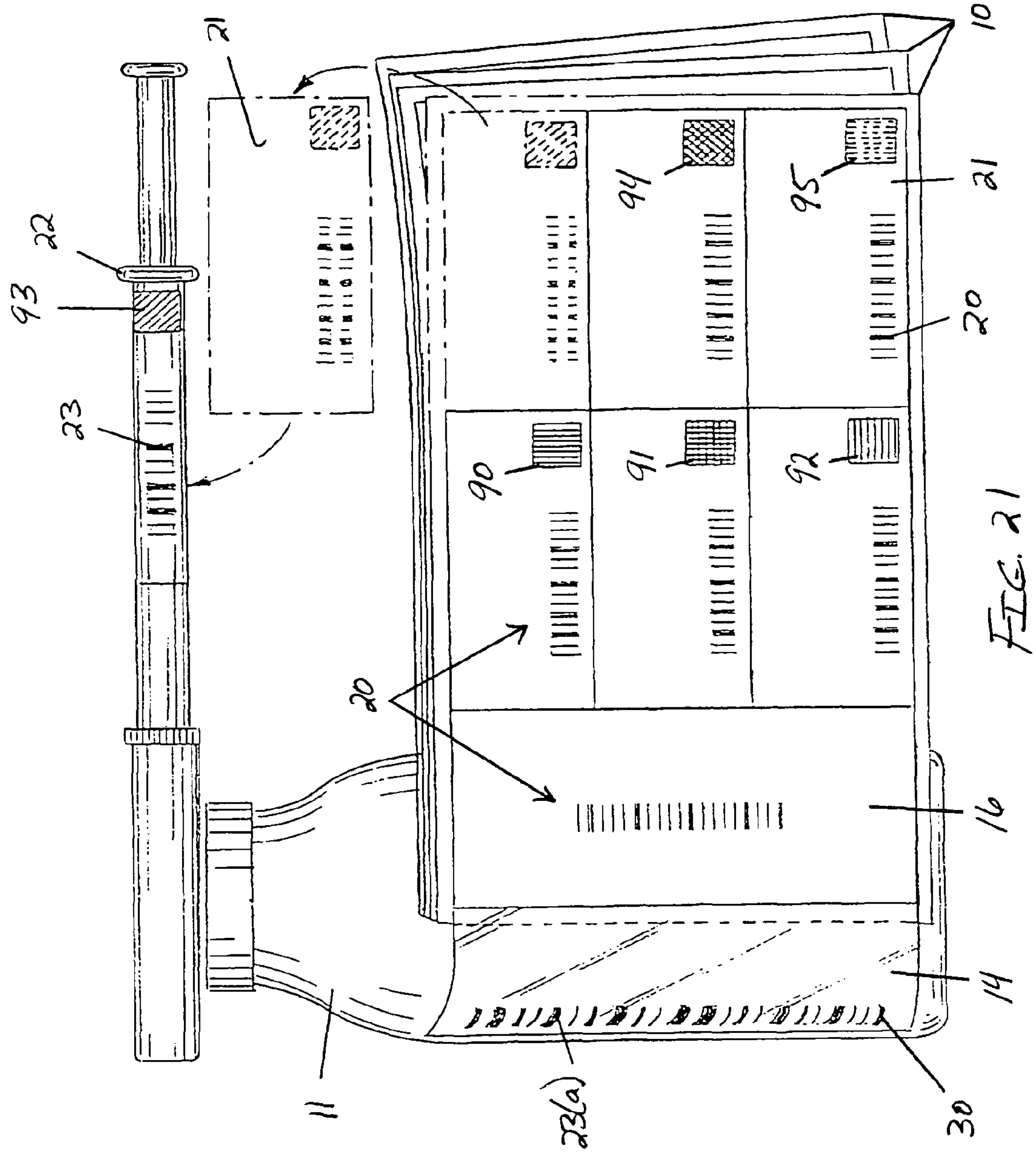
FIG. 21 is a more detailed depiction of a primary source container, a secondary dose container, and a series of multi-flag labels attached in layered relation to the primary source container via first ends thereof. The primary source container bears code indicia viewable through layered transparent ends of the multi-flag labels, the parent and child labels bear corresponding code indicia, and a single child label is shown in solid as attached to the secondary dose container and in phantom as removed from the top most multi-flag label.

If it could be estimated that the patient may need more withdrawals from the original container 11, then a user could stack three (3) of the labels 10 on top of each other such that the clear area 14 overlies information otherwise displayed upon the source container 11 as generally depicted in FIGS. 20 and 21.

For example, if it is estimated that up to 18 doses will be administered to a given patient, the user could stack three (3) labels 10 onto container 11, with each label 10 comprising six (6) child labels and that would provide 18 miniature or child labels 21 so the nurse could use it up to 18 times to have the miniature label 21 applied to the syringe 22 and taken to the bedside so that the item is always identified to the bedside which is a very important thing to do.

The bar code 23 on the miniature label 21 would be scanned at the bedside and matched up with the wristband that has a bar code from the patient. Notably, the identification means of the source container may comprise a bar code as at 23(*a*). At this writing, it is estimated that only 5% of the hospitals in the U.S. are doing bedside scanning at this point but it growing to grow and be mandatory that dose dispensing personnel scan the medications before they give them to a patient to prevent medication errors. Primary purposes of the label 10 are to provide reliable identification at the bedside as well as to provide a bar code to the hospitals that are using a bar code administration system.

As stated, the label 10 preferably comprises a peel away paper-based backing or bottom layer 40 for exposing adhesive as at 70. Each of the child labels 21 would be peeled off one at a time and applied to the item that is going to be used to withdraw the medication from the original container 11. The intermediate layer 50 and top layer 60 are permanently bonded to one another as at 71. It is contemplated that the intermediate layer 50 is uniformly transparent and may be constructed from any suitable state of the art polymer, and that the top layer 60 is uniformly opaque and may be constructed either from any suitable polymer or any suitable paper. Indicia such as the bar codes 23 may either be thermally transferred to the top layer 60 if constructed from a polymeric material or printed thereupon with any suitable ink if constructed from a paper-based material.

The child labels 21 may be applied to a syringe 22 (or a small cup to be taken to the patient's bedside) (not specifically illustrated) and taken to the bedside and be permanently identified to the bedside which would meet the requirements in the medical facility. The labels 21 preferably comprise bar coding 23 to allow the nurses to scan the bar code 23 to make sure it is the correct medication being given to the patient at that time. When the nurse scans the bar code 23, said bar code may operate to identify the time the medication was given which is an important feature.

Certain methodology for using the label 10 is believed to be supported by the label 10 and in this regard, the method may be said to comprise a series of steps including, noting patient/medicine from a given patient's medicine source bottle 11; printing the patient/medicine from the medicine source container 11 upon a multi-flag label 10; adhesively attaching one or more multi-flag labels 10 to the container 11; drawing a dose from the container 11 into a dose delivery vessel or secondary container; removing a child label 21 from the label 10; adhesively attaching the removed child label 21 to the secondary container; and inputting the printed information from the child label 21 into a dose tracking mechanism.

While the above description contains much specificity, this specificity should not be construed as limitations on the scope of the invention, but rather as an exemplification of the invention. For example, it is contemplated that the present invention essentially describes and teaches a multi-flag label for label-linking a primary container to at least one secondary container. The multi-flag label according to the present invention may be said to essentially and structurally comprise a bifurcated first or bottom layer, a transparent second layer or polymeric construction, and an opaque third layer of a synthetic resin, ink, polymeric, or paper-based construction.

The first or bottom layer as at 40 has a first layer length and a first layer width. The first layer is bifurcated widthwise as at back cut 43 into two first layer segments as at 41 and 42, which widthwise bifurcation is intermediate the first layer length such that the first layer segments 41 and 42 are of unequal length as may be seen from a general inspection of FIGS. 16, 17, and 18.

The second or intermediate layer as at 50 has a second layer length and a second layer width lesser in magnitude relative to the first layer length and first layer width such that the second layer 50 is concentric with the first layer 40 and further such that the first layer essentially frames the second layer with a peripheral boundary as at 80. The peripheral boundary 80 functions to enhance removal of the first layer 40 from the label flags such as child labels 21. The second layer 50 is removably and adhesively attached to the first layer 40 via adhesive backing 70.

The third or top layer as at 60 has a third layer length and a third layer width. The third layer width is essentially coextensive with the second layer width. However, the third layer length is preferably lesser in magnitude relative to the second layer length. The third layer 60 is permanently attached or bonded to the second layer as at 71 such that a first end of the second layer 50 is aligned with a first end of the third layer 60 as generally depicted and referenced at 81. A second end of the third layer 60 terminates upon the second layer 50 for visually exposing the back cut 43 via the otherwise exposed transparent second layer 50. The second and third layers 50 and 60 are preferably die cut as at 82 for effecting multiple label flags (i.e. labels 16 and 21) upon or adhesively attached to the first layer 40.

Certain coded indicia may be imprinted upon or otherwise transferred to the top layer 60 so as to impart color coded means portions of the multiple label flags. In this regard, the reader is directed to FIG. 21 which depicts various colors upon each of the child labels 21. For example, the child labels 21 may be said to respectively bear the colors red (as at 90), yellow (as at 91), blue as at (92), green (as at 93), orange (as at 94), and purple (as at 95).

Stated in other words, it is contemplated that the label according to the present invention may be said to describe or teach a multi-flag label for identifying at least one secondary container as cross-linked to a primary container. The multi-flag label according to the present invention may thus be said to essentially and alternatively comprise a transparent first end, an intermediate parent label region, and a flagged second end.

The transparent first end comprises end-based adhesive (as at 70) for adhesively attaching the first end as at 18 to a primary container as at 11 in superficial adjacency to (i.e. blanketing or overlying) information (as at 23(*a*)) borne by the primary container 11. The first end thus simultaneously functions to attach the label 10 to the primary container 11 and enables a user to visually perceive the information borne by the primary container 11.

The parent label region (as at 16) extends from the transparent first end intermediate the first and end the flagged second end. The parent label regions bears parent-label based information. The flagged second end (as terminating at 19) extends from the parent label region 16 and comprises at least one child label (as at 21). Each child label comprises a flag-based adhesive (as at 70) and child-label based information. The flag-based adhesive functions to adhesively attach each child label to a secondary container such as a syringe 22. The child-label based information is preferably cross-linked to the parent label-based information for identifying the secondary container as cross-linked to the primary container 11.

The method of using the label 10 may be said to comprise or be defined by a dose tracking method comprising the steps of: placing information associated with a source container upon a parent label and a child label, the parent and child labels forming a portion of a multi-flag label; attaching a transparent end of the multi-flag label to the source container, the transparent end overlying the information associated with the source container; drawing a dose from the source container into a dose container; removing the child label from the multi-flag label; attaching the removed child label to the dose container; and inputting the information from the child label into a dose tracking mechanism.

Accordingly, although the invention has been described by reference to a preferred embodiment and certain dose tracking methodology, it is not intended that the novel labeling system and method be limited thereby, but that modifications thereof are intended to be included as falling within the broad scope and spirit of the foregoing disclosure and the appended drawings.

I claim:

1. A multi-layered, multi-flag label for label-linking a primary container to at least one secondary container, the multi-layered, multi-flag label comprising:

a bifurcated first label layer, the first label layer having a first layer length and width, the first label layer thus being bifurcated widthwise into first and second layer segments intermediate the first layer length at a back cut, the first segment having a first segment length and width and the second segment having a second segment length and width;

a transparent second label layer, the second label layer having a second layer length and width lesser in magnitude relative to the first layer length and width, the second label layer being removably and adhesively attached to the first label layer for linking the first and second segments at the back cut thereby forming a transparent source-attaching portion and a labeling portion first layer, the source-attaching portion having a source-attaching portion length lesser in magnitude than the first layer width, and a source-attaching portion width greater in magnitude than the first segment width; and an opaque third label layer, the third label layer having a third layer length and width, the third layer width being coextensive with the second layer width, the third layer length being lesser in magnitude relative to the second layer length, the third label layer being permanently attached to the second label layer for forming a labeling portion second layer such that a first end of the second label layer is aligned with a first end of the third label layer, and a second end of the third label layer terminates upon the second label layer for visually exposing the back cut via the transparent second label layer, the labeling portion first and second layers defining a parent label portion and a child label portion, the second and third label layers being cut through the labeling portion first and second layers of the child label portion for effecting at least one child label flags adjacent the parent label portion removably and adhesively attached upon the first label layer.

2. The multi-layered, multi-flag label of claim 1 wherein the second label layer is concentric with the first label layer such that the first label layer frames the second label layer with a peripheral boundary, the peripheral boundary for enhancing removal of the first label layer from each child label flag.

3. The multi-layered, multi-flag label of claim 1 wherein the first label layer is a paper-based medium and the second label layer is a polymer-based medium.

4. The multi-layered, multi-flag label of claim 3 wherein the third label layer is a select medium selected from the group consisting of an ink medium and a paper-based medium.

5. The multi-layered, multi-flag label of claim 1 wherein the third label layer bears code indicia for linking the parent label to each child label.

6. The multi-layered, multi-flag label of claim 5 wherein the code indicia comprise varied colors for color code linking the parent label to each child label.

7. The multi-layered, multi-flag label of claim 1 for linking a primary container defined by a source container to at least one secondary container defined by a dose container.

8. A multi-layered, multi-flag label for identifying at least one dose container as emergent from a source container, the multi-layered, multi-flag label comprising:

a bifurcated bottom label layer, the bottom label layer having first and second segments separated by a back cut, the first and second segments having equal segment widths and unequal segment lengths;

a transparent intermediate label layer, the intermediate label layer being removably and adhesively attached to the bottom label layer thereby linking the first and second segments at the back cut thereby forming a transparent source-attaching portion and a labeling portion first layer, the source-attaching portion having a source-attaching portion length lesser in magnitude than the equal segment widths, and a source-attaching portion width greater in magnitude than a first of the unequal segment lengths and lesser in magnitude than a second of the unequal segment lengths; and an opaque top label layer, the top label layer being widthwise coextensive and lengthwise abbreviated relative to the intermediate label layer, the top label layer being permanently attached to the intermediate label layer for forming a labeling portion second layer such that first ends of the intermediate and top label layers are aligned, a second end of the top label layer terminating upon the intermediate label layer for visually exposing the back cut via the intermediate label layer, the labeling portion first and second layers defining a parent label portion and a child label portion, the intermediate and top label layers being cut through the labeling portion first and second layers of the child label portion for effecting at least one child flag adjacent the parent label portion removably and adhesively attached upon the bottom label layer.

9. The multi-layered, multi-flag label of claim 8 wherein the bottom label layer frames the intermediate label layer at a peripheral boundary, the peripheral boundary for enhancing removal of the bottom label layer from the intermediate label layer.

10. The multi-layered, multi-flag label of claim 8 wherein the bottom label layer is a paper-based medium and the intermediate label layer is a polymer-based medium.

11. The multi-layered, multi-flag label of claim 10 wherein the top label layer is a select medium selected from the group consisting of a polymer-based medium and a paper-based medium.

12. The multi-layered, multi-flag label of claim 8 wherein the flag labels comprise a parent label and at least one child label, the top label layer bearing code indicia for label-linking the parent label with the child label.

13. The multi-layered, multi-flag label of claim 12 wherein the code indicia comprise varied colors for color code linking the parent label to the child label.

* * * * *